United States Patent
Kim et al.

(10) Patent No.: US 11,505,287 B2
(45) Date of Patent: Nov. 22, 2022

(54) STAND-ALONE BUOY WITH SEAWATER BATTERY

(71) Applicants: UNIST (ULSAN NATIONAL INSTITUTE OF SCIENCE AND TECHNOLOGY), Ulsan (KR); KOREA EAST-WEST POWER CO., LTD., Ulsan (KR); 4 to One Co., Ltd., Ulsan (KR)

(72) Inventors: Young sik Kim, Ulsan (KR); Young jin Kim, Ulsan (KR); Myung jae Kim, Ulsan (KR); Young gi Kim, Pohang-si (KR); Hye Jin Kim, Ulsan (KR)

(73) Assignees: UNIST (ULSAN NATIONAL INSTITUTE OF SCIENCE AND TECHNOLOGY), Ulsan (KR); KOREA EAST-WEST POWER CO., LTD., Ulsan (KR); 4 to One Co., Ltd., Ulsan (KR)

( * ) Notice: Subject to any disclaimer, the term of this patent is extended or adjusted under 35 U.S.C. 154(b) by 299 days.

(21) Appl. No.: 16/857,930

(22) Filed: Apr. 24, 2020

(65) Prior Publication Data
US 2020/0339226 A1 Oct. 29, 2020

(30) Foreign Application Priority Data
Apr. 26, 2019 (KR) .......................... 10-2019-0049310

(51) Int. Cl.
*H02S 40/38* (2014.01)
*H01M 6/34* (2006.01)
(Continued)

(52) U.S. Cl.
CPC .............. *B63B 22/00* (2013.01); *H01M 6/34* (2013.01); *H01M 10/465* (2013.01);
(Continued)

(58) Field of Classification Search
CPC ...... H01L 31/00–078; Y02E 10/50–60; H01M 10/465; H01M 6/34
(Continued)

(56) References Cited

U.S. PATENT DOCUMENTS

| | | | | |
|---|---|---|---|---|
| 5,395,707 A | * | 3/1995 | McCarter | H01M 6/34 429/130 |
| 6,168,882 B1 | * | 1/2001 | Inoue | H02J 7/34 429/118 |
| 2015/0344109 A1 | * | 12/2015 | Davoodi | G05D 1/0206 367/5 |

FOREIGN PATENT DOCUMENTS

| | | | |
|---|---|---|---|
| JP | 2011088577 | * | 5/2011 |
| KR | 101236277 B1 | | 2/2013 |
| KR | 200471996 | * | 3/2014 |

OTHER PUBLICATIONS

JP2011088577 English translation (Year: 2011).*
KR200471996 English translation (Year: 2014).*

\* cited by examiner

*Primary Examiner* — Bach T Dinh
(74) *Attorney, Agent, or Firm* — Studebaker & Brackett PC

(57) ABSTRACT

The present disclosure relates to a stand-alone buoy with a seawater battery, which includes a main body formed to have a predetermined buoyancy so as to float on seawater and provided with a seawater space therein and an inlet formed to introduce the seawater into the seawater space, a position notification part installed on the main body and configured to notify a user of a position of the main body, a solar cell part installed on the main body and configured to generate electricity using sunlight, and a seawater battery unit installed in the seawater space to be submerged in the seawater introduced into the seawater space and configured to react with the seawater to store the electricity provided (Continued)

from the solar cell part and to provide the stored electricity to the position notification part so as to operate the position notification part.

8 Claims, 5 Drawing Sheets

(51) Int. Cl.
*B63B 22/00* (2006.01)
*H02S 20/30* (2014.01)
*H01M 10/46* (2006.01)

(52) U.S. Cl.
CPC .............. *H02S 20/30* (2014.12); *H02S 40/38* (2014.12); *B63B 2022/006* (2013.01); *H01M 2220/10* (2013.01)

(58) Field of Classification Search
USPC .................................................. 136/243–265
See application file for complete search history.

STAND-ALONE BUOY WITH SEAWATER BATTERY

CROSS-REFERENCE TO RELATED APPLICATION

This application claims priority to and the benefit of Korean Patent Application No. 10-2019-0049310, filed on Apr. 26, 2019, the disclosure of which is incorporated herein by reference in its entirety.

BACKGROUND

1. Field of the Invention

The present invention relates to a stand-alone buoy with a seawater battery, and more specifically, to a stand-alone buoy operated using electricity stored in a seawater battery.

2. Discussion of Related Art

Buoys are installed to detect weather situations, heights of waves, and wave directions of the sea or used as indication units capable of indicating positions of danger zones or fishing nets.

Generally, in the conventional buoy, a battery is installed in the conventional buoy so that the battery supplies electricity to operate a lamp or other electronic device. However, there are disadvantages in that the buoy should be periodically replaced and the battery becomes corroded due to seawater.

Accordingly, a self-generation typed lighting buoy disclosed in Korea Patent No. 10-1236277 has been developed, the lighting buoy includes a self-generation typed lighting module having a coil outside the self-developing lighting module and a magnet which is disposed in the coil and reciprocates due to vertical movement of a wave. An interior and an exterior of the lighting module are completely sealed so that the lighting module can be used semi-permanently.

However, in the corresponding related art, since the self-generation typed lighting buoy moves due to a force of the wave, it is difficult to continuously obtain a current in the case of a state in which a tidal force and the like are somewhat unstable.

SUMMARY

The present invention is directed to providing a stand-alone buoy with a seawater battery that allows electricity generated by a solar cell part by reacting with seawater to be stored and supplies the stored electricity to an electronic device such as an indicator lamp.

According to an aspect of the present invention, there is provided a stand-alone buoy with a seawater battery, the stand-alone buoy including a main body formed to have a predetermined buoyancy so as to float on seawater and provided with a seawater space therein and an inlet formed to introduce the seawater into the seawater space, a position notification part installed on the main body and configured to notify a user of a position of the main body, a solar cell part installed on the main body and configured to generate electricity using sunlight, and a seawater battery unit installed in the seawater space to be submerged in the seawater introduced into the seawater space and configured to react with the seawater to store the electricity provided from the solar cell part and to provide the stored electricity to the position notification part so as to operate the position notification part.

The stand-alone buoy may further include a global positioning system (GPS) module which is formed in the main body, generates position information about the main body, transmits the generated position information to a management server, and is operated by receiving the electricity from the seawater battery unit.

The stand-alone buoy may further include an environmental information collector which is installed in the main body, collects environmental information of the surroundings of the main body, and transmits the collected environmental information to the management server.

The environmental information collector may include a temperature sensor installed in the main body to measure a temperature of the seawater on which the main body floats, and a camera installed on the main body to capture an image of the surroundings of the main body.

The GPS module may transmit the position information about the main body to the management server at predetermined set time intervals.

The GPS module may also transmit the position information about the corresponding main body to the management server in a case in which the main body moves to a reference distance or more or moves beyond a preset reference range due to a tide.

The position notification part may include a case detachably coupled to an outer circumferential surface of the main body, provided with an installation space in which a GPS module is installed, and formed of a light transmissive material, and at least one light emitting diode (LED) installed in the case and configured to generate indication light.

The stand-alone buoy may also further include an optical sensor installed in the main body to detect sunlight incident on the main body, an inner magnet part installed in the main body and having a predetermined magnetic force, an outer magnet having a predetermined magnetic force to be magnetically coupled to the inner magnet part so as to be attached to the outer circumferential surface, which is opposite the inner magnet part, of the main body, a mode selector configured to determine an attachment position of the outer magnet with respect to the inner magnet part and to select any one mode among an operating mode, a stop mode, or an automated mode according to the determined attachment position, and a control module, in a case in which the mode selector selects the automated mode, configured to stop an indicator lamp and charge the seawater battery unit using the electricity generated by the solar cell part when sunlight is incident on the main body based on detection information provided by the optical sensor and configured to operate the position notification part when sunlight is not incident on the main body, in a case in which the mode selector selects the operating mode, configured to operate the position notification part to emit the indication light all the time, and in a case in which the mode selector selects the stop mode, and configured to stop operation of the position notification part and operate the GPS module or stop operations of both of the LED and the GPS module.

The stand-alone buoy may further include at least one guide member formed to protrude toward the seawater battery unit at a position which is adjacent to the inlet on an inner wall surface of the main body to guide the seawater introduced into the seawater space through the inlet to the seawater battery unit.

The main body may be formed to have a spherical shape, and a weight body may be installed in the main body at a position, which is adjacent to the inlet on an inner wall surface of the main body, and have a predetermined weight such that the inlet is positioned under the surface of the sea when the stand-alone buoy floats on the seawater.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
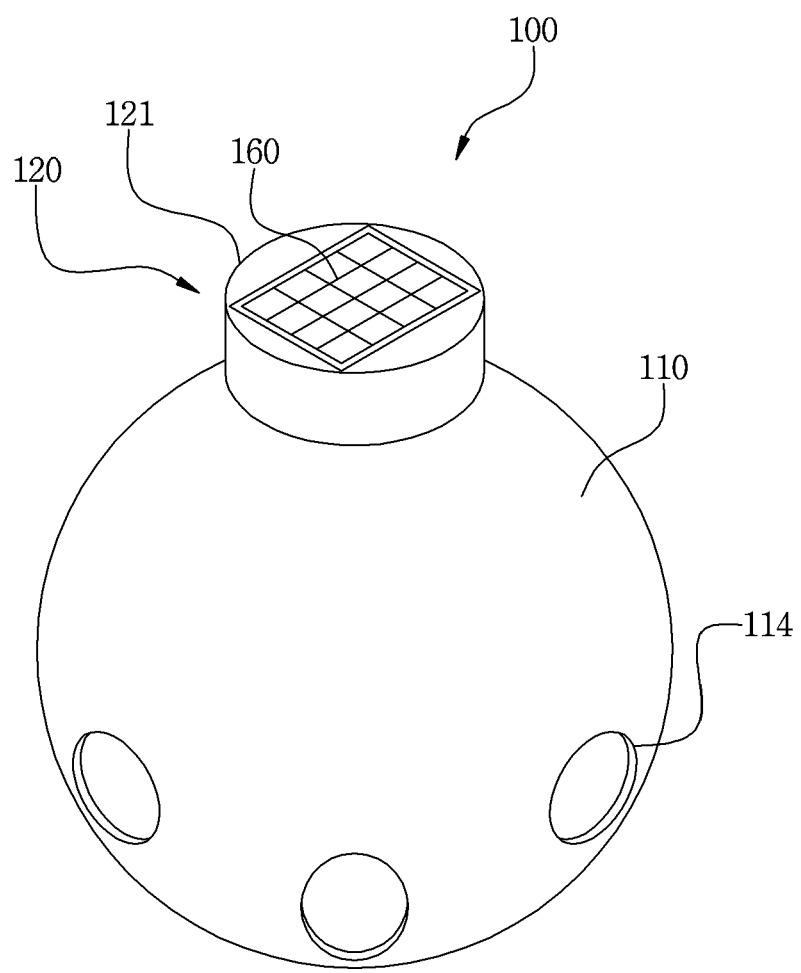
FIG. 1 is a perspective view illustrating a stand-alone buoy with a seawater battery according to the present invention.

Hereinafter, a stand-alone buoy with a seawater battery according to embodiments of the present invention will be described in detail with reference to the accompanying drawings. Since the present invention allows for various changes and numerous embodiments, specific embodiments will be illustrated in the drawings and described in detail in the written description. However, this is not intended to limit the present invention to specific embodiments, and it is to be appreciated that all changes, equivalents, and substitutes that do not depart from the spirit and technical scope of the present invention are encompassed in the present invention. Like numbers refer to like elements throughout the description of the figures. In the accompanying drawings, sizes of structures are greater than those of actual structures for clarity of the present invention.

It will be understood that, although the terms "first," "second," etc. may be used herein to describe various elements, these elements should not be limited by these terms. These terms are only used to distinguish one element from another element. For example, a first element could be termed a second element, and a second element could similarly be termed a first element without departing from the scope of the present invention.

The terminology used herein to describe the specific embodiments of the present invention is not intended to limit the scope of the present invention. The singular forms "a," "an," and "the" used in the present specification include the plural forms as well, unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It should be further understood that terms in common usage should also be interpreted as is customary in the relevant art and not in an idealized or overly formal sense unless expressly so defined herein.

Figure 2:
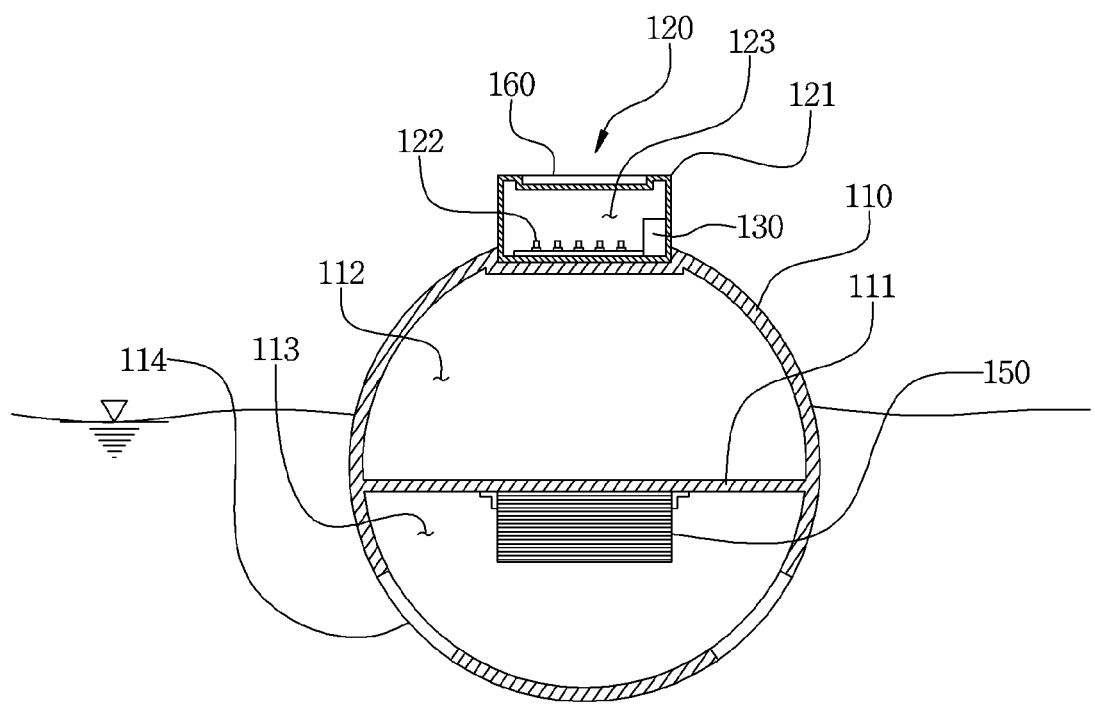
FIG. 2 is a cross-sectional view illustrating the stand-alone buoy with a seawater battery of FIG. 1.
Figure 3:
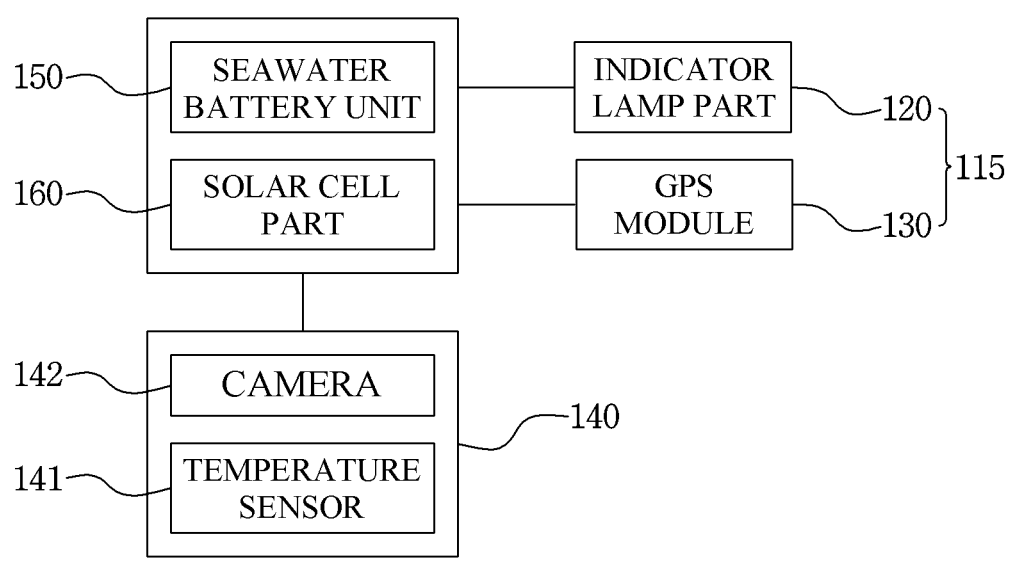
FIG. 3 is a block diagram illustrating the stand-alone buoy with a seawater battery of FIG. 1.

In FIGS. 1 to 3, a stand-alone buoy 100 with a seawater battery according to the present invention is illustrated.

Referring to the drawings, the stand-alone buoy 100 with a seawater battery includes a main body 110 formed to have a predetermined buoyancy to float on seawater and provided with a seawater space 113 therein and an inlet 114 formed to introduce the seawater into the seawater space 113, a position notification part 115 installed in the main body 110 and configured to notify a user of a position of the main body 110, a solar cell part 160 installed in the main body 110 and configured to generate electricity using incident sunlight, an environmental information collector 140 installed in the main body 110 and configured to collect environmental information of the surroundings of the main body 110 and transmit the collected environmental information to a management server, and a seawater battery unit 150 installed in the seawater space 113 to be submerged in the seawater introduced into the seawater space 113 and configured to react with the seawater to store the electricity provided from the solar cell part 160 and supply the stored electricity to the position notification part 115 to operate the position notification part 115.

The main body 110 is formed to have a spherical shape in which an inner space is provided and which is formed of a synthetic resin such as plastic having a predetermined strength and excellent formability. A coupling hole is formed in an upper portion of the main body 110 such that a case 121 of the position notification part 115 may be inserted into and coupled to the coupling hole. In addition, an optical sensor (not shown) configured to detect sunlight incident on the main body 110 is installed on an outer circumferential surface of the main body 110.

A partition wall 111 dividing the inner space into a floating space 112 and a seawater space 113, which are vertically disposed, is formed in the main body 110. The floating space 112 and the seawater space 113 are formed independently due to the partition wall 111, and an inner wall surface of the floating space 112 may be waterproofed to prevent seawater from being introduced into the floating space 112. The main body 110 has a predetermined buoyancy due to the floating space 112.

In this case, the main body 110 includes a plurality of inlets 114 communicating with the seawater space 113, and the inlets 114 may be formed in a lower portion of the main body 110. When the main body 110 floats on seawater, the seawater is introduced into the seawater space 113 through the inlets 114.

Meanwhile, in the illustrated embodiment, the main body 110 is formed in the spherical shape but is not limited thereto, and the main body 110 may also be formed to have any shape such as a cylindrical or conical shape.

The position notification part 115 includes an indicator lamp part 120 installed on the main body 110 and configured to emit indication light and a global positioning system (GPS) module 130 installed in the main body 110 and configured to generate position information about the main body 110 and transmit the generated position information to the management server.

The indicator lamp part 120 includes the case 121 detachably coupled to the outer circumferential surface of the main body 110, provided with an installation space 123 formed therein, and formed of a light transmissive material, and a plurality of light emitting diodes (LEDs) 122 installed in the case 121 that generate the indication light.

The case 121 is formed to have a cylindrical shape and coupled to an upper end portion of the main body 110. Meanwhile, although not illustrated in the drawings, threads of a male screw may also be formed in a lower end portion of the case 121 and threads of a female screw may also be formed on an inner circumferential surface of the coupling hole of the main body 110 so that the case 121 may be screw-coupled to the main body 110.

The plurality of LEDs 122 are installed in the installation space 123 of the case 121 and are operated due to electricity supplied from the seawater battery unit 150.

Meanwhile, the indicator lamp part 120 further includes a controller (not shown) configured to determine whether it is daytime or nighttime based on detection information provided from an optical sensor and control the LEDs 122. In a case in which sunlight is incident on the main body 110, the controller determines that it is daytime and stops operation of the LEDs 122, and in a case in which sunlight is not incident on the main body 110, the controller determines that it is nighttime and operates the LEDs 122.

The GPS module 130 receives GPS signals from satellites to generate position information of the main body 110 and is installed in the installation space 123 of the case 121. Meanwhile, the GPS module 130 is not limited thereto and may also be installed in the floating space 112 of the main body 110. In this case, the GPS module 130 is operated by receiving electricity from the seawater battery unit 150 during both daytime and nighttime. In addition, the GPS module 130 further includes a communication module (not shown) to transmit the generated position information of the main body 110 to the management server.

In this case, the communication module of the GPS module 130 transmits the position information about the main body 110 to the management server at predetermined set time intervals to save power consumed by the communication module. In this case, a set time may be 10 minutes. In addition, even in a case in which the main body 110 moves to a reference distance or more due to a tidal current or moves beyond a predetermined reference range, the GPS module 130 may also transmit the position information about the corresponding main body 110 to the management server.

The solar cell part 160 is installed on an upper surface of the case 121 and includes a plurality of solar cells configured to generate electricity using sunlight. The solar cell part 160 transmits the generated electricity to the seawater battery unit 150.

Meanwhile, the solar cell part 160 may include an auxiliary battery (not shown) storing predetermined power to prepare for a case in which the seawater battery unit 150 is not sufficiently charged due to external environmental factors such as continuous bad weather.

The environmental information collector 140 includes a temperature sensor 141 installed in the main body 110 to measure a temperature of seawater on which the main body 110 floats and a camera 142 installed on the main body 110 to capture an image of the surroundings of the main body 110.

Although not illustrated in the drawings, the temperature sensor 141 is installed on an outer circumferential surface of the lower portion, which is submerged in seawater, of the main body 110 so as to be in contact with the seawater. The camera 142 is installed on the upper portion of the main body 110 to capture an image of the surroundings of the main body 110. The environmental information collector 140 transmits temperature information of the temperature sensor 141 and image information of the camera 142 to the management server by using the communication module of the GPS module 130. In this case, the environmental information collector 140 may be supplied with electricity from the seawater battery unit 150 to operate.

The seawater battery unit 150 is fixed to a surface of a ceiling of the seawater space 113 of the main body 110 and reacts with seawater introduced into the seawater space 113 to store electricity. Although not illustrated in the drawings, the seawater battery unit 150 includes a positive electrode having a cathode submerged in the seawater, a negative electrode having an anode impregnated in an organic electrolyte, and a solid electrolyte positioned between the positive electrode and the negative electrode to divide the positive electrode from the negative electrode. In this case, the cathode includes a catalyst layer formed of an electrochemical catalyst material which is used for intercalation, deintercalation, and bifunctional electrode catalysis reaction of sodium ions.

In this case, the seawater battery unit 150 is not limited thereto and may be any power storage unit configured to react with seawater to store electricity. The seawater battery unit 150 provides the stored electricity to the position notification part 115, the GPS module 130, and the environmental information collector 140.

Operation of the stand-alone buoy 100 with a seawater battery according to the present invention which is formed as described above will be described in detail below.

First, the main body 110 of the stand-alone buoy 100 with a seawater battery is installed in an installation target sea sector. In this case, the main body 110 floats on the surface of the sea, and seawater is introduced into the seawater space 113 of the main body 110 through the inlets 114. In the case of daytime, the solar cell part 160 generates electricity using incident sunlight, the seawater battery unit 150 installed in the seawater space 113 reacts with the seawater introduced into the seawater space 113 to store the electricity generated by solar cell part 160, and the stored electricity is provided to the position notification part 115, the GPS module 130, and the environmental information collector 140.

In this case, during nighttime when sunlight is not incident on the main body 110, the position notification part 115 emits indication light using the electricity supplied from the seawater battery unit 150 to indicate a position of the main body 110. In addition, the GPS module 130 generates position information about the main body 110 and transmits the generated position information to the management server through the communication module. In addition, the environmental information collector 140 transmits seawater temperature and captured image information of the surroundings of the main body 110 to the management server.

As described above, the stand-alone buoy 100 with a seawater battery according to the present invention stores the electricity generated by the solar cell part 160 in the seawater battery unit 150 which reacted with the seawater, and the stored electricity is supplied to an electronic device such as an indicator lamp, and thus there is an advantage in that the stand-alone buoy 100 with a seawater battery can be used for a long time without replacing the battery.

In addition, in the stand-alone buoy 100 with a seawater battery, when the seawater battery unit 150 in the main body 110 is in contact with the seawater, the position notification part 115, the GPS module 130, and the environmental information collector 140 is operated using stored electricity, and when the main body 110 is collected, the seawater battery unit 150 is not in contact with the seawater and electricity is not stored and supplied, operations of the position notification part 115, the GPS module 130, and the environmental information collector 140 are stopped, or operation thereof is stopped by manipulation of a worker, and thus a seawater detection sensor is not necessary.

Figure 4:
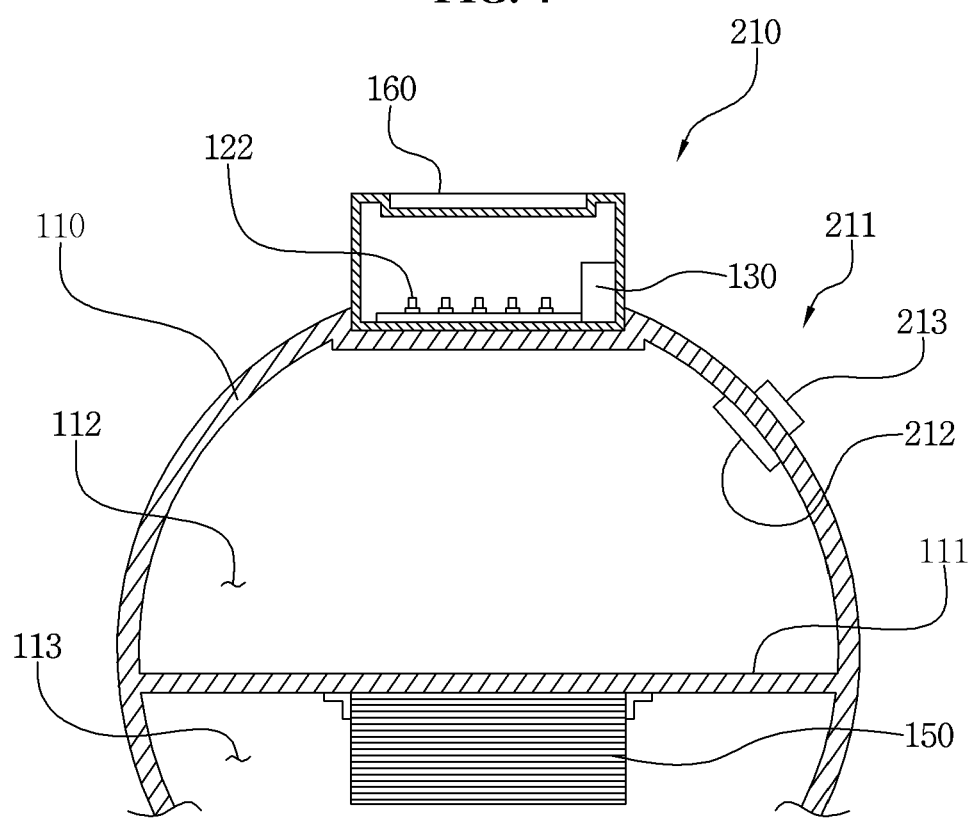
FIG. 4 is a cross-sectional view illustrating a stand-alone buoy with a seawater battery according to another embodiment of the present invention.
Figure 5:
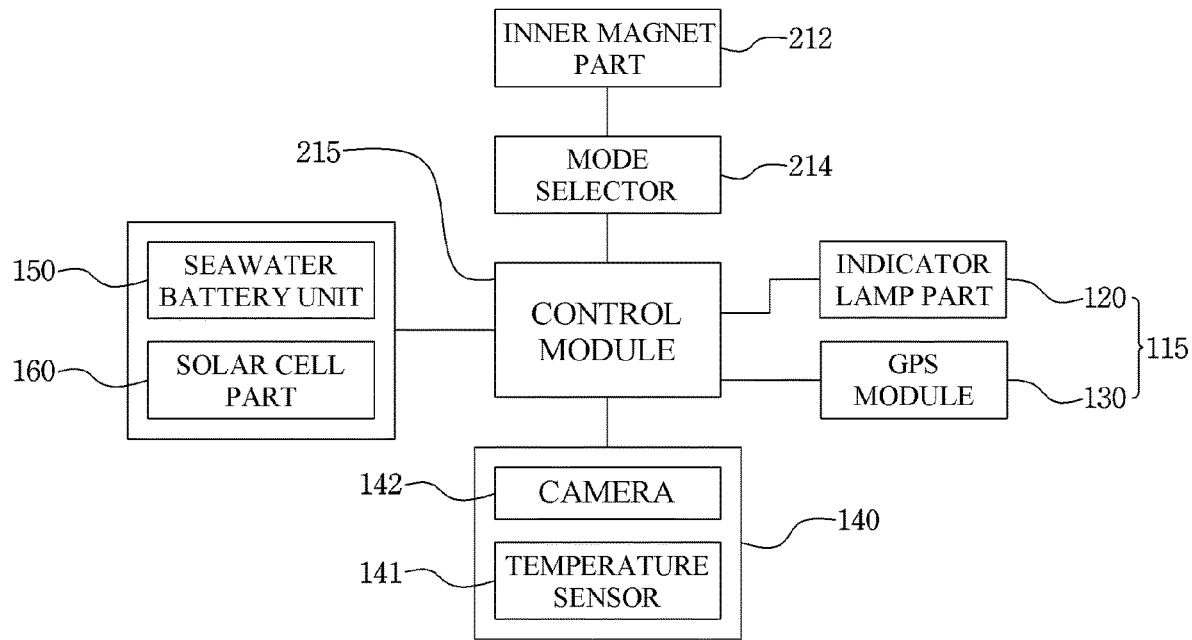
FIG. 5 is a block diagram illustrating the stand-alone buoy with a seawater battery of FIG. 4.

Meanwhile, in FIGS. 4 and 5, a stand-alone buoy 210 with a seawater battery according to another embodiment of the present invention is illustrated.

Elements configured to perform the same functions in previously illustrated drawings are referred to as the same reference symbols.

Referring to the drawings, the stand-alone buoy 210 with a seawater battery includes a switch unit 211 that allows the stand-alone buoy 210 with a seawater battery to be operated in any one mode among an operating mode, a stop mode, or an automated mode.

The switch unit 211 includes an inner magnet part 212 installed in the main body 110 and having a predetermined magnetic force, an outer magnet 213 having a predetermined magnetic force to be magnetically coupled to the inner magnet part 212 so as to be attached to the outer circumferential surface, which is opposite to the inner magnet part 212, of the main body 110, a mode selector 214 configured to determine an attachment position of the outer magnet 213 with respect to the inner magnet part 212 and to select any one mode among the operating mode, the stop mode, or the automated mode according to the determined attachment position, and a control module 215 configured to control the position notification part 115, the GPS module 130, and the environmental information collector 140 according to the mode selected by the mode selector 214.

The inner magnet part is installed on an inner surface of the floating space 112 of the main body 110 and includes first to third magnetic switches. Although the first to third magnetic switches are not illustrated in the drawings, the first to third magnetic switches are disposed to be spaced apart from each other in a lateral direction and each have a predetermined magnetic force. In this case, the main body 110 displays "stop mode," "automated mode," and "operating mode" corresponding to the first to third magnetic switches on the outer circumferential surface thereof.

A permanent magnet having a predetermined magnetic force is applied to the outer magnet, and a user attaches the outer magnet to any one position among positions corresponding to "stop mode," "automated mode," and "operating mode" on the outer circumferential surface of the main body 110. In this case, the outer magnet is attached to the outer circumferential surface of the main body 110 due to the magnetic force of the first to third magnetic switches.

The mode selector 214 is connected to the inner magnet part, determines a magnetic switch which attaches the outer magnet to the outer circumferential surface of the main body 110 among the first to third magnetic switches, and selects any one mode among the operating mode, the stop mode, or the automated mode on the basis of information about the determined magnetic switch. That is, when the outer magnet is attached to a position of "stop mode," which is opposite the first magnetic switch, of the outer circumferential surface of the main body 110 by the first magnetic switch, the mode selector 214 selects the stop mode, when the outer magnet is attached to a position of "automated mode," which is opposite the second magnetic switch, of the outer circumferential surface of the main body 110 by the second magnetic switch, the mode selector 214 selects the automated mode, when the outer magnet is attached to a position of "operating mode," which is opposite the third magnetic switch, of the outer circumferential surface of the main body 110 by the third magnetic switch, the mode selector 214 selects the operating mode, and selected information is transferred to the control module 215.

In a case in which the mode selector 214 selects the automated mode, when sunlight is incident on the main body 110 based on detection information provided by the optical sensor, the control module 215 determines that it is daytime and stops operation of the LEDs 122 and the seawater battery unit 150 is charged with electricity generated by the solar cell part 160, and when sunlight is not incident on the main body 110, the control module 215 determines that it is nighttime and operates the LEDs 122.

In addition, in a case in which the mode selector 214 selects the operating mode, the control module 215 operates the LEDs 122 to emit indication light all the time. In addition, when the mode selector 214 selects the stop mode, the control module 215 stops operation of the LEDs 122 and operates the GPS module 130. In this case, the control module 215 may also stop operations of both of the LED 122 and the GPS module 130.

Since the switch unit 211 formed as described above controls operation of the position notification part 115 using the inner magnet part 212 and the outer magnet, a drilling process for installing the switches is not necessary in the main body 110, and thus water tightness of the floating space 112 can be maintained.

Figure 6:
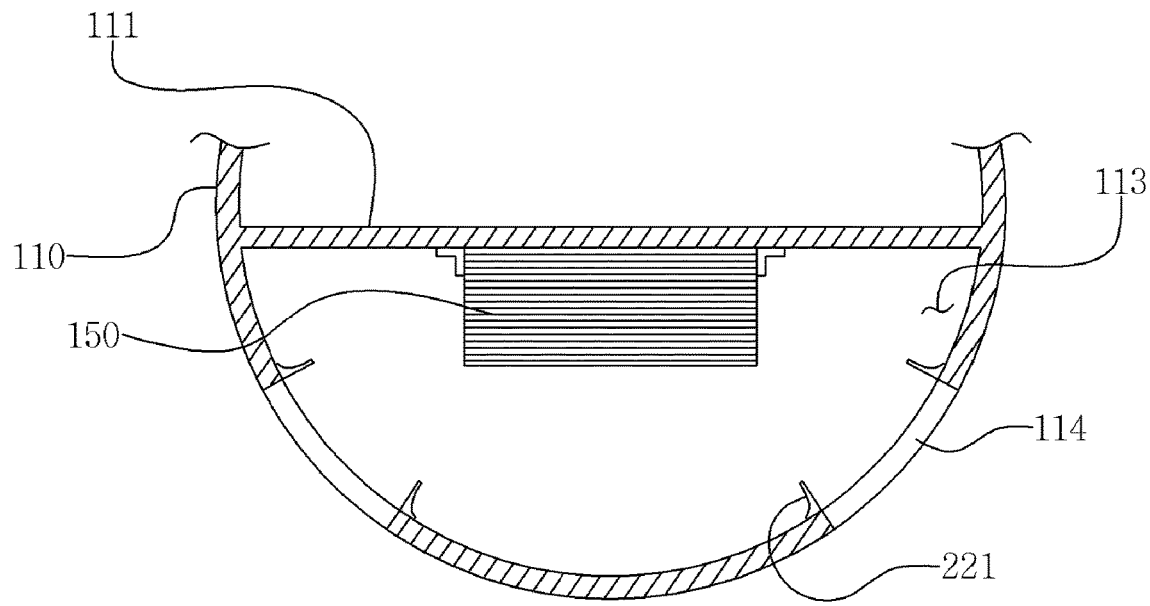
FIG. 6 is a cross-sectional view illustrating a stand-alone buoy with a seawater battery according to still another embodiment of the present invention.

Meanwhile, in FIG. 6, a stand-alone buoy 220 with a seawater battery according to still another embodiment of the present invention is illustrated.

Referring to the drawing, the stand-alone buoy 220 with a seawater battery includes guide members 221 formed at positions which are adjacent to the inlets 114 on an inner wall surface of the main body 110 so as to guide seawater introduced into the seawater space 113 through the inlets 114 to the seawater battery unit 150.

The plurality of guide members 221 are formed to be spaced apart from each other along edges of the inlets and to protrude a predetermined length from the inner wall surface of the main body 110 toward the seawater battery unit 150. Since the seawater introduced into the seawater space 113 due to a sea current is guided to the seawater battery unit 150 by the guide members 221, there is an advantage in that the seawater battery unit 150 is in contact with the seawater newly introduced into the seawater space 113 to increase an electricity generation rate.

Figure 7:
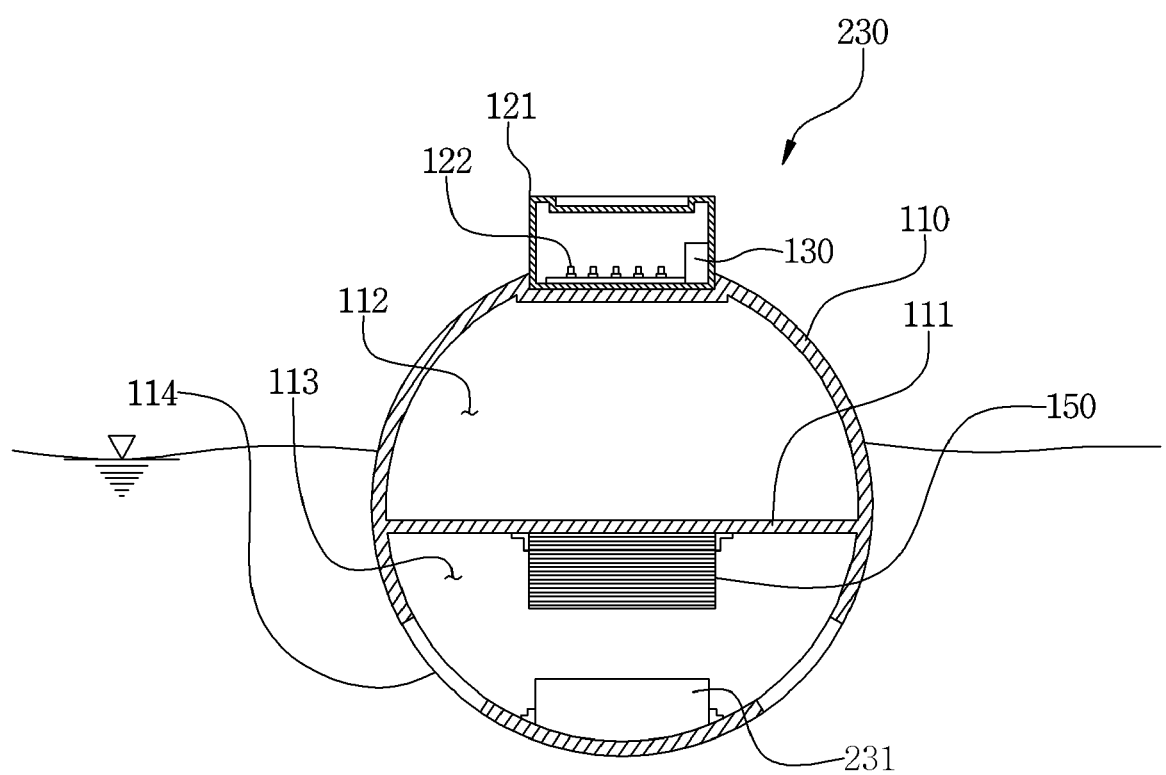
FIG. 7 is a cross-sectional view illustrating a stand-alone buoy with a seawater battery according to yet another embodiment of the present invention.

Meanwhile, in FIG. 7, a stand-alone buoy 230 with a seawater battery according to yet another embodiment of the present invention is illustrated.

Referring to the drawing, the stand-alone buoy 230 with a seawater battery includes a weight body 231 formed to have a spherical shape, installed at a position which is adjacent to the inlets 114 on the inner wall surface of the main body 110 such that the inlets 114 are positioned under the surface of the sea when the stand-alone buoy 230 with a seawater battery floats on seawater, and having a predetermined weight.

The weight body 231 may be formed of a metal material having a predetermined weight and installed on a bottom surface of the seawater space 113. Even when the main body 110 is inclined due to a sea current or tide, since the inlets 114 are positioned under the surface of the sea due to the weight of the weight body 231, there is an advantage in that the seawater is more stably introduced into the seawater space 113.

In a stand-alone buoy with a seawater battery according to the present invention, since electricity generated by a solar cell part is stored in a seawater battery unit reacting with seawater and the stored electricity is supplied to an electronic device such as an indicator lamp, there is an advantage in that the stand-alone buoy with a seawater battery can be used for a long time without replacing a battery.

The description about the disclosed embodiments is provided for those skilled in the art to use or implement the present invention. Various modifications of the embodiments will be clear to those skilled in the art, and general principles defined in the present specification may be applied to other embodiments without departing from the scope of the present invention. Therefore, the present invention is not limited to the embodiments disclosed in the present specification and should be interpreted within the widest scope consistent with the principles and novel features disclosed in the present specification.

What is claimed is:

1. A stand-alone buoy with a seawater battery, comprising:
    a main body formed to have a predetermined buoyancy so as to float on seawater and provided with a seawater space therein and an inlet formed to introduce the seawater into the seawater space;
    a position notification part installed on the main body and configured to notify a user of a position of the main body;
    a solar cell part installed on the main body and configured to generate electricity using sunlight;
    a seawater battery unit installed in the seawater space to be submerged in the seawater introduced into the seawater space and configured to react with the seawater to store the electricity provided from the solar cell part and to provide the stored electricity to the position notification part so as to operate the position notification part,
    wherein the position notification part includes:
    a case detachably coupled to an outer circumferential surface of the main body, provided with an installation space in which a global positioning system (GPS) module is installed, and formed of a light transmissive material; and
    at least one light emitting diode (LED) installed in the case and configured to generate indication light for indicating the position of the main body;
    an optical sensor installed in the main body to detect sunlight incident on the main body;
    an inner magnet part installed in the main body and having a predetermined magnetic force;
    an outer magnet having a predetermined magnetic force to be magnetically coupled to the inner magnet part so as to be attached to the outer circumferential surface, which is opposite the inner magnet part, of the main body;
    a mode selector configured to determine an attachment position of the outer magnet with respect to the inner magnet part and to select any one mode among an operating mode, a stop mode, or an automated mode according to the determined attachment position; and
    a control module, in a case in which the mode selector selects the automated mode, configured to stop operation of the LED and charge the seawater battery unit using the electricity generated by the solar cell part when sunlight is incident on the main body based on detection information provided by the optical sensor and configured to operate the LED when sunlight is not incident on the main body, in a case in which the mode selector selects the operating mode, configured to operate the LED to emit the indication light all the time, and in a case in which the mode selector selects the stop mode, configured to stop operation of the LED all the time and operate the GPS module or stop operations of both of the LED and the GPS module,
    wherein the position notification part further includes the GPS module installed in the main body and configured to generate position information about the main body, to transmit the generated position information to a management server, and to be operated by receiving the electricity from the seawater battery unit.

2. The stand-alone buoy of claim 1, wherein the GPS module generates position information about the main body, transmits the generated position information to a management server, and is operated by receiving the electricity from the seawater battery unit.

3. The stand-alone buoy of claim 1, further comprising an environmental information collector which is installed in the main body, collects environmental information of the surroundings of the main body, and transmits the collected environmental information to the management server.

4. The stand-alone buoy of claim 3, wherein the environmental information collector includes:
    a temperature sensor installed in the main body to measure a temperature of the seawater on which the main body floats; and
    a camera installed on the main body to capture an image of the surroundings of the main body.

5. The stand-alone buoy of claim 2, wherein the GPS module transmits the position information about the main body to the management server at predetermined set time intervals.

6. The stand-alone buoy of claim 2, wherein the GPS module transmits the position information about the corresponding main body to the management server in a case in which the main body moves to a reference distance or more or moves beyond a preset reference range due to a tide.

7. The stand-alone buoy of claim 1, further comprising at least one guide member formed to protrude toward the seawater battery unit at a position which is adjacent to the inlet on an inner wall surface of the main body to guide the seawater introduced into the seawater space through the inlet to the seawater battery unit.

8. The stand-alone buoy of claim 1, wherein the main body is formed to have a spherical shape, and a weight body is installed in the main body at a position, which is adjacent to the inlet, on an inner wall surface of the main body, and has a predetermined weight such that the inlet is positioned under the surface of the sea when the stand-alone buoy floats on the seawater.

* * * * *